United States Patent
Lu et al.

(10) Patent No.: US 9,243,725 B2
(45) Date of Patent: Jan. 26, 2016

(54) GLASS-FIBER REINFORCED PLASTIC PIPE

(71) Applicants: Zhangjiagang CIMC Sanctum Cryogenic Equipment Co., Ltd., Zhangjiagang (CN); CHINA INTERNATIONAL MARINE CONTAINERS (GROUP) LTD., Shenzhen (CN)

(72) Inventors: Jia Lu, Zhangjiagang (CN); Gencang Liu, Zhangjiagang (CN); Haoming Wang, Zhangjiagang (CN); Jie Gao, Zhangjiagang (CN); Dongjin Liu, Zhangjiagang (CN); Xiaofang Wu, Zhangjiagang (CN)

(73) Assignees: ZHANGJIAGANG CIMC SANCTUM CRYOGENIX EQUIPMENT CO., LTD. (CN); CHINA INTERNATIONAL MARINE CONTAINERS (GROUP) LTD. (CN); CIMC ENRIC INVESTMENT HOLDINGS (SHENZHEN) CO., LTD. (CN)

( * ) Notice: Subject to any disclaimer, the term of this patent is extended or adjusted under 35 U.S.C. 154(b) by 163 days.

(21) Appl. No.: 13/738,569

(22) Filed: Jan. 10, 2013

(65) Prior Publication Data
US 2013/0319901 A1  Dec. 5, 2013

(30) Foreign Application Priority Data
Jun. 5, 2012  (CN) ...................... 2012 2 0265482 U

(51) Int. Cl.
*F16L 9/14* (2006.01)
*F16L 9/04* (2006.01)
*F17C 13/08* (2006.01)

(52) U.S. Cl.
CPC ................. *F16L 9/04* (2013.01); *F17C 13/084* (2013.01); *F17C 2205/018* (2013.01); *F17C 2223/0161* (2013.01); *F17C 2260/033* (2013.01)

(58) Field of Classification Search
CPC .......... B32B 1/08; B32B 15/04; B32B 17/00; B32B 15/08; F17C 2205/0107
USPC ......... 138/149, 137–139, 177, 172, 174, 143, 138/153; 137/376; 248/677, 678; 211/182; 428/36.9–36.92, 35.8
See application file for complete search history.

(56) References Cited

U.S. PATENT DOCUMENTS 3,002,534 A * 10/1961 Noland .......................... 138/141
3,130,439 A *  4/1964 Bovaird .......................... 15/268
3,371,797 A *  3/1968 Caligiuri ....................... 211/204

(Continued)

*Primary Examiner* — Kevin P Shaver
*Assistant Examiner* — Michael J Melaragno
(74) *Attorney, Agent, or Firm* — Fox Rothschild LLP; Jianming J. Hao

(57) ABSTRACT

A glass-fiber reinforced plastic pipe comprises a pipe body and an inner core fixedly provided on an inner wall of the pipe body, wherein an upper end of the inner core is lower than an upper end of the pipe body, so that a first heat-insulating space is formed between the upper ends of the inner core and the pipe body, and a lower end of the inner core is higher than a lower end of the pipe body, so that a second heat-insulating space is formed between the lower ends of the inner core and the pipe body. Due to the inner core as a reinforce structure, the shear resistance strength of the glass-fiber reinforced plastic pipe is improved without increasing the thickness of the pipe wall, and furthermore the mechanical performance of a supporting device of the cryogenic pressure vessel is improved.

18 Claims, 2 Drawing Sheets

(56) References Cited

U.S. PATENT DOCUMENTS

| | | | | |
|---|---|---|---|---|
| 3,552,445 | A * | 1/1971 | Andrews | 138/144 |
| 3,720,235 | A * | 3/1973 | Schrock | 138/137 |
| 3,867,048 | A * | 2/1975 | Endzweig | 403/252 |
| 3,873,219 | A * | 3/1975 | Pofferi | 403/171 |
| 3,884,269 | A * | 5/1975 | Schetty et al. | 138/137 |
| 3,912,410 | A * | 10/1975 | Pofferi | 403/170 |
| 3,938,900 | A * | 2/1976 | Apple, Sr. | 403/263 |
| 4,036,371 | A * | 7/1977 | Michel | 211/182 |
| 4,105,819 | A * | 8/1978 | Kotcharian | 428/213 |
| 4,139,025 | A * | 2/1979 | Carlstrom | 138/153 |
| 4,347,090 | A * | 8/1982 | Anderson et al. | 156/149 |
| 4,840,826 | A * | 6/1989 | Shirasaki et al. | 428/36.91 |
| 4,971,846 | A * | 11/1990 | Lundy | 428/35.8 |
| 5,242,721 | A * | 9/1993 | Oonuki et al. | 428/34.5 |
| 5,629,062 | A * | 5/1997 | Ejiri et al. | 428/36.9 |
| 5,682,925 | A * | 11/1997 | Seckel | 138/118 |
| 5,972,450 | A * | 10/1999 | Hsich et al. | 428/35.9 |
| 6,354,334 | B1 * | 3/2002 | Ellyin et al. | 138/143 |
| 7,541,078 | B1 * | 6/2009 | Arritt et al. | 428/36.91 |
| 7,600,537 | B2 * | 10/2009 | Bhatnagar et al. | 138/137 |
| 2002/0054968 | A1 * | 5/2002 | Hauber | 428/34.4 |
| 2002/0134451 | A1 * | 9/2002 | Blasko et al. | 138/140 |
| 2002/0182357 | A1 * | 12/2002 | Soles et al. | 428/36.91 |
| 2004/0086672 | A1 * | 5/2004 | Yoshino | 428/35.8 |
| 2005/0281972 | A1 * | 12/2005 | Purgert et al. | 428/36.5 |
| 2006/0174960 | A1 * | 8/2006 | Evans | 138/137 |
| 2007/0026177 | A1 * | 2/2007 | Kitahara et al. | 428/36.91 |
| 2007/0193676 | A1 * | 8/2007 | Portoles | 156/169 |
| 2007/0259147 | A1 * | 11/2007 | Boudry et al. | 428/36.8 |
| 2009/0139661 | A1 * | 6/2009 | Frimel et al. | 156/498 |
| 2009/0206231 | A1 * | 8/2009 | Firman et al. | 248/677 |
| 2010/0101130 | A1 * | 4/2010 | Boyce | 40/607.01 |
| 2010/0266790 | A1 * | 10/2010 | Kusinski et al. | 428/34.6 |
| 2011/0124446 | A1 * | 5/2011 | McGuire et al. | 473/513 |
| 2012/0202045 | A1 * | 8/2012 | Mutsuda et al. | 428/318.4 |
| 2013/0156979 | A1 * | 6/2013 | Stewart | 428/34.7 |
| 2014/0227533 | A1 * | 8/2014 | Murakami et al. | 428/421 |
| 2014/0311614 | A1 * | 10/2014 | Edmondson et al. | 138/140 |
| 2014/0346811 | A1 * | 11/2014 | Zaluzec et al. | 296/187.12 |

* cited by examiner

GLASS-FIBER REINFORCED PLASTIC PIPE

CROSS-REFERENCE TO RELATED APPLICATIONS

The present application claims priority to Chinese Patent Application Serial No. 201220265482.X, filed on Jun. 5, 2012, the contents of which are hereby incorporated by reference.

TECHNICAL FIELD

The invention relates to a glass-fiber reinforced plastic pipe for a supporting device in a cryogenic pressure vessel, more particularly, to a glass-fiber reinforced plastic pipe with an inner core for a supporting device in a cryogenic pressure vessel.

BACKGROUND ART

In a cryogenic pressure vessel, the cryogenic performance is an important factor to judge the total performance of the vessel. The cryogenic pressure vessel is usually a vacuum heat insulation vessel, and heat is mainly conducted from a heat insulating layer and a supporting device. As a result, the main route to improve the cryogenic performance of the vessel is to reduce the heat conduction of the supporting device. Currently, the glass-fiber reinforced plastic pipe is mostly used as the material of the supporting device of the cryogenic pressure vessel. However, the shear resistance strength of the glass-fiber reinforced plastic pipe is worse, so that the thickness of the glass-fiber reinforced plastic pipe needs to be larger when a larger shear stress is applied on the supporting device. Consequently, the heat conduction of the glass-fiber reinforced plastic pipe become larger therewith, so as to reduce the cryogenic performance directly.

Therefore, it is an urgent technical problem to be solved by those skilled, in the art to provide a glass-fiber reinforced plastic pipe with better shear resistance strength.

SUMMARY OF THE INVENTION

An object of the present invention is to provide a glass-fiber reinforced plastic pipe with better shear resistance strength.

To achieve the object, the invention provides a glass-fiber reinforced plastic pipe, which may comprise a pipe body and an inner core fixedly provided on an inner wall of the pipe body, wherein an upper end of the inner core may be lower than an upper end of the pipe body, so that a first heat-insulating space is formed between the upper end of the inner core and the upper end of the pipe body, a lower end of the inner core may be higher than a lower end of the pipe body, so that a second heat-insulating space is formed between the lower end of the inner core and the lower end of the pipe body.

In an embodiment of the invention, the inner core may be a stainless steel pipe and is fixedly connected to the pipe body with an interference fit.

In an embodiment of the invention, either of the first heat-insulating space and the second heat-insulating space may have a thickness of 5 mm or more.

In an embodiment of the invention, at least one first through hole may be provided on the side wall of the pipe body, and at least one second through hole communicating with the at least one first through hole respectively may be provided on the side wall of the inner core correspondingly.

In an embodiment of the invention, when the glass-fiber reinforced plastic pipe is in a non-air exhausting state, a pipe pin may be inserted in the first through hole and the corresponding second through hole communicating with the first through hole.

In an embodiment of the invention, the inner side of the inner core may be provided with at least one reinforce ring.

In an embodiment of the invention, the inner side of the inner core may be provided with at least one vertical rib.

In an embodiment of the invention, the inner core may have a thickness of 1 mm-6 mm. In an embodiment of the invention, the pipe body may have a thickness of 8 mm-30 mm, and an outer diameter of 150 mm-320 mm.

Another object of the present invention is to provide a cryogenic pressure vessel having a supporting device with better shear resistance strength.

To achieve the object, the invention also provides a cryogenic pressure vessel, and a supporting device of the cryogenic pressure vessel may be made of the glass-fiber reinforced plastic pipe as mentioned above.

The advantages of the invention lie in that the glass-fiber reinforced plastic pipe of the invention is provided with an inner core as a reinforce structure, so that the shear resistance strength of the glass-fiber reinforced plastic pipe is improved without increasing the thickness of the pipe wall, and furthermore the mechanical performance of the supporting device of the cryogenic pressure vessel is improved.

BRIEF DESCRIPTION OF THE DRAWINGS

Hereinafter, the embodiments of the present invention will be described in detail with reference to the accompanying drawings, in which.

DETAILED DESCRIPTION OF THE PREFERRED EMBODIMENTS

The embodiments of the invention will be described in detail hereinafter. However, the embodiments are just examples, rather than intended to limit the scope of the invention.

Figure 1:
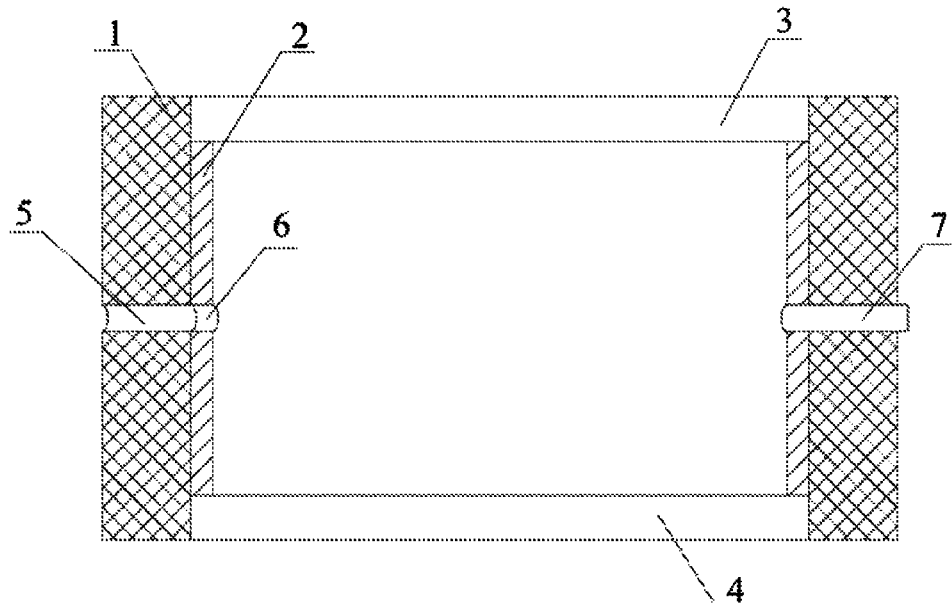
FIG. 1 is a schematic diagram showing the glass-fiber reinforced plastic pipe according to the invention.

FIG. 1 is a schematic diagram showing the glass-fiber reinforced plastic pipe according to the invention. As shown in FIG. 1, the glass-fiber reinforced plastic pipe according to the invention includes a pipe body 1 and an inner core 2 fixedly provided on the inner wall of the pipe body 1, wherein the upper end of the inner core 2 is lower than the upper end of the pipe body 1, so that a first heat-insulating space 3 is formed between the upper end of the inner core 2 and the upper end of the pipe body 1; and the lower end of the inner core 2 is higher than the lower end of the pipe body 1, so that a second heat-insulating space 4 is formed between the lower end of the inner core 2 and the lower end of the pipe body 1. The inner core 2 is preferably a stainless steel pipe, and the method for fixing the inner core 2 to the pipe body 1 includes but is not limited, to interference fit, sticking, and so on. However, considering the lateral shear resistance strength of the glass-fiber reinforced plastic pipe, the preferable way of fixing the inner core 2 to the pipe body 1 is the interference fit. To meet the designing requirements of the fittings of the cryogenic pressure vessel, the thickness of the inner core 2 is preferably 1 mm-6 mm, the thickness of the pipe body 1 is preferably 8 mm-30 mm, and the outer diameter of the pipe body 1 is preferably 150 mm-320 mm.

Since the inner core 2 is made of harder material, such as stainless steel, steel or the like, the heat insulating performance of the inner core 2 is worse, and the inner core 2 should not contact with the cryogenic pressure vessel directly. For this, the glass-fiber reinforced plastic pipe of the invention is provided with a first heat-insulating space 3 and a second heat-insulating space 4 to reduce the heat conduction. To achieve the predetermined heat insulating index, the thicknesses of the first heat-insulating space 3 and the second heat-insulating space 4 should be 5 mm or more.

If a higher heat insulating performance is required, the inner part of the glass-fiber reinforced plastic pipe should be vacuumized to prevent the heat conduction via air. At least one first through hole 5 is provided on the side wall of the pipe body 1, and correspondingly, at least one second through hole 6 communicating with the at least one first through hole 5 respectively is provided on the side wall of the inner core 2. When the glass-fiber reinforced plastic pipe is in a non-air exhausting state, namely after the inner part of the glass-fiber reinforced plastic pipe is vacuumized, a pipe pin 7 may be inserted into the first through hole 5 and the second through hole 6 communicating with the first through hole 5. In this case, the pipe pin 7 can isolate the air as well as assist in fixing and connecting the inner core 2 and the pipe body 1. If a lower heat insulating performance is required, it is not necessary to make the glass-fiber reinforced plastic pipe vacuum, and the pipe pin 7 can be inserted in at least one set of the first through hole 5 and the corresponding second through hole 6 communicating with the first through hole 5 as to help fixing and connecting the inner core 2 and the pipe body 1.

Figure 2:
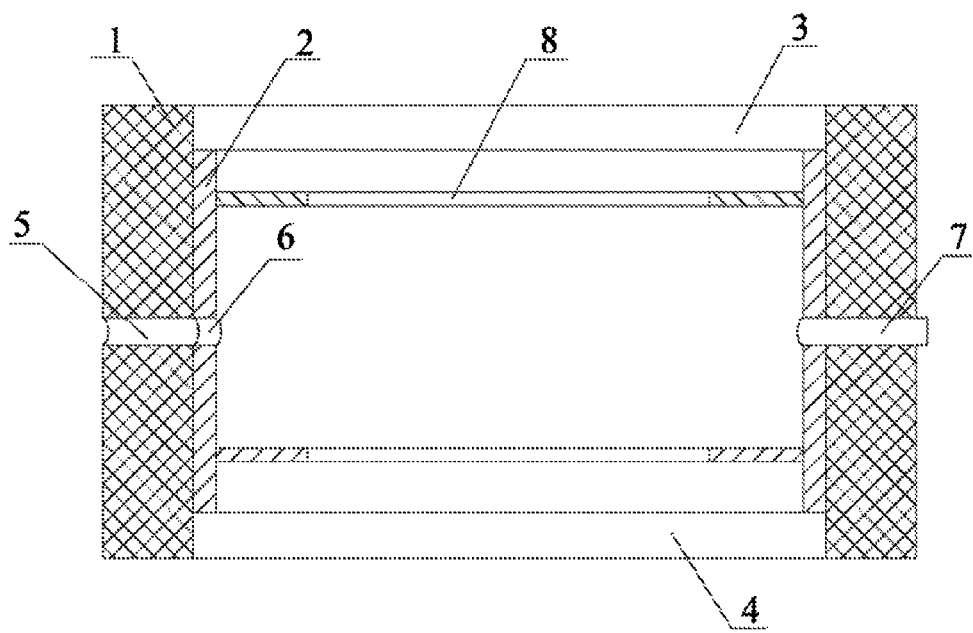
FIG. 2 is a schematic diagram showing the glass-fiber reinforced plastic pipe with a reinforce structure according to the invention.
Figure 3:
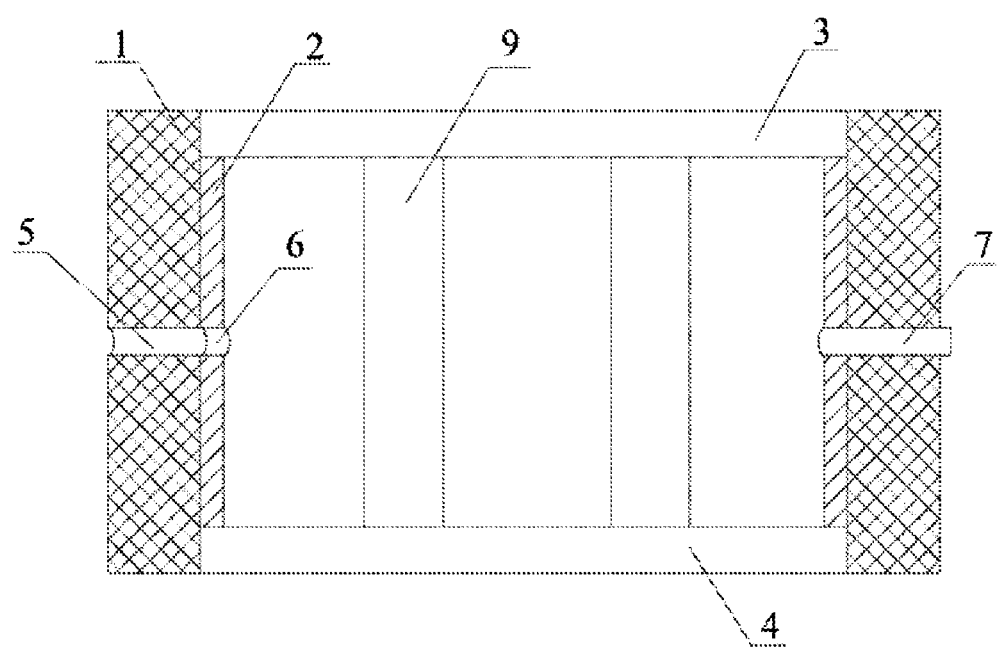
FIG. 3 is a schematic diagram showing the glass-fiber reinforced plastic pipe with another reinforce structure according to the invention.

To enhance the fixing and connecting effect between the inner core 2 and the pipe body a reinforce structure can be further provided at the inner side of the inner core 2. As shown in FIG. 2, the reinforce structure at the inner side of the inner core 2 is a reinforce ring 6, which is perpendicular to the axis of the inner core and is welded to the inner wall of the inner core 2. As shown in FIG. 3, the reinforce structure at the inner side of the inner core 2 is a vertical rib 9, and the vertical rib 9 is welded to the inner wall of the inner core 2 in a direction parallel to the axis of the inner core.

Besides, the invention also provides a cryogenic pressure vessel, and the glass-fiber reinforced plastic pipe mentioned above is utilized in the supporting device of the cryogenic pressure vessel.

Although the invention has been described as above in reference to several typical embodiments, it should be understood that the terms used therein are just illustrative and exemplary rather than restrictive. Since the invention can be applied in various forms without departing from the spirit or principle of the invention, it should be understood that the above mentioned embodiments will not be limited to any specific details mentioned above, rather, they should be construed broadly in the spirit or concept of the invention defined by the appended claims. Therefore, the present invention aims to cover all the modifications or variations falling within the protection scope defined by the appended claims.

What is claimed is:

1. A glass-fiber reinforced plastic pipe for a supporting device in a cryogenic pressure vessel, comprising a pipe body and an inner core fixedly provided on an inner wall of the pipe body, wherein an upper end of the inner core is lower than an upper end of the pipe body, so that a first heat-insulating space is formed between the upper end of the inner core and the upper end of the pipe body; and a lower end of the inner core is higher than a lower end of the pipe body, so that a second heat-insulating space is formed between the lower end of the inner core and the lower end of the pipe body.

2. The glass-fiber reinforced plastic pipe according to claim 1, wherein the inner core is a stainless steel pipe and is fixedly connected to the pipe body with an interference fit.

3. The glass-fiber reinforced plastic pipe according to claim 2, wherein either of the first heat-insulating space and the second heat-insulating space has a thickness of 5 mm or more.

4. The glass-fiber reinforced plastic pipe according to claim 3, wherein at least one first through hole is provided on the side wall of the pipe body, and correspondingly at least one second through hole communicating with the at least one first through hole respectively is provided on the side wall of the inner core.

5. The glass-fiber reinforced plastic pipe according to claim 4, wherein a pipe pin is inserted in the first through hole and the second through hole communicating with the first through hole when the glass-fiber reinforced plastic pipe is in a non-air exhausting state.

6. The glass-fiber reinforced plastic pipe according to claim 5, wherein the inner side of the inner core is provided with at least one reinforce ring.

7. The glass-fiber reinforced plastic pipe according to claim 5, wherein the inner side of the inner core is provided with at least one vertical rib.

8. The glass-fiber reinforced plastic pipe according to claim 1, wherein the inner core has a thickness of 1 mm-6 mm.

9. The glass-fiber reinforced plastic pipe according to claim 1, wherein the pipe body has a thickness of 8 mm-30 mm and an outer diameter of 150 mm-320 mm.

10. A cryogenic pressure vessel, wherein a supporting device of the cryogenic pressure vessel is made of the glass-fiber reinforced plastic pipe according to claim 1.

11. The cryogenic pressure vessel according to claim 10, wherein the inner core is a stainless steel pipe and is fixedly connected to the pipe body with an interference fit.

12. The cryogenic pressure vessel according to claim 11, wherein either of the first heat-insulating space and the second heat-insulating space has a thickness of 5 mm or more.

13. The cryogenic pressure vessel according to claim 12, wherein at least one first through hole is provided on the side wall of the pipe body, and correspondingly at least one second through hole communicating with the at least one first through hole respectively is provided on the side wall of the inner core.

14. The cryogenic pressure vessel according to claim 13, wherein a pipe pin is inserted in the first through hole and the second through hole communicating with the first through hole when the glass-fiber reinforced plastic pipe is in a non-air exhausting state.

15. The cryogenic pressure vessel according to claim 14, wherein the inner side of the inner core is provided with at least one reinforce ring.

16. The cryogenic pressure vessel according to claim 14, wherein the inner side of the inner core is provided with at least one vertical rib.

17. The cryogenic pressure vessel according to claim 10, wherein the inner core has a thickness of 1 mm-6 mm.

18. The cryogenic pressure vessel according to claim 10, wherein the pipe body has a thickness of 8 mm-30 mm and an outer diameter of 150 mm-320 mm.

* * * * *

UNITED STATES PATENT AND TRADEMARK OFFICE
CERTIFICATE OF CORRECTION

PATENT NO. : 9,243,725 B2
APPLICATION NO. : 13/738569
DATED : January 26, 2016
INVENTOR(S) : Jia Lu et al.

It is certified that error appears in the above-identified patent and that said Letters Patent is hereby corrected as shown below:

Title Page

Item (30) Foreign Application Priority Data, replace "201220265482 U" with "201220265482.X"

Signed and Sealed this
Tenth Day of May, 2016

Michelle K. Lee
*Director of the United States Patent and Trademark Office*